United States Patent
Ryan et al.

(10) Patent No.: US 9,144,743 B2
(45) Date of Patent: *Sep. 29, 2015

(54) SYSTEM TO DECODE VIDEO SIGNAL FROM ELECTRONIC GAMING DEVICE AND TO DETERMINE PLAY INFORMATION

(71) Applicant: IGT, Las Vegas, NV (US)

(72) Inventors: Chad A. Ryan, Henderson, NV (US); Sam Johnson, Las Vegas, NV (US); Zaki Khal, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,296

(22) Filed: Nov. 18, 2013

(65) Prior Publication Data

US 2014/0179445 A1    Jun. 26, 2014

Related U.S. Application Data

(63) Continuation of application No. 11/847,062, filed on Aug. 29, 2007, now Pat. No. 8,585,479, which is a continuation-in-part of application No. 11/468,946, filed on Aug. 31, 2006, which is a continuation-in-part of application No. 10/689,407, filed on Oct. 20, 2003, now Pat. No. 7,335,106.

(51) Int. Cl.
*A63F 13/00* (2014.01)
*A63F 13/30* (2014.01)
*G07F 17/32* (2006.01)

(52) U.S. Cl.
CPC ............ *A63F 13/12* (2013.01); *G07F 17/3237* (2013.01)

(58) Field of Classification Search
USPC .................... 463/12–20, 25, 39–43
See application file for complete search history.

(56) References Cited

U.S. PATENT DOCUMENTS

| | | |
|---|---|---|
| 4,448,419 A | 5/1984 | Telnaes |
| 5,130,794 A | 7/1992 | Ritchey |
| 5,152,529 A | 10/1992 | Okada |
| 6,262,694 B1 | 7/2001 | Ishimoto et al. |
| 6,517,433 B2 | 2/2003 | Loose et al. |
| 6,651,252 B1 | 11/2003 | Gordon et al. |
| 6,661,425 B1 | 12/2003 | Hiroaki |
| 7,160,187 B2 | 1/2007 | Loose et al. |
| 7,329,181 B2 | 2/2008 | Hoshino et al. |
| 7,488,252 B2 | 2/2009 | Griswold et al. |
| 7,505,519 B2 | 3/2009 | Gordon et al. |
| 7,704,136 B2 * | 4/2010 | Shackleford et al. ........... 463/13 |
| 7,753,773 B2 | 7/2010 | Baerlocher et al. |
| 7,841,944 B2 | 11/2010 | Wells |
| 8,032,906 B2 | 10/2011 | Gordon et al. |
| 8,047,908 B2 | 11/2011 | Walker et al. |
| 8,142,273 B2 | 3/2012 | Williams et al. |
| 8,192,281 B2 | 6/2012 | Williams et al. |
| 8,199,068 B2 | 6/2012 | Williams et al. |
| 8,210,922 B2 | 7/2012 | Williams et al. |
| 8,272,958 B2 | 9/2012 | Smith et al. |

(Continued)

*Primary Examiner* — Sunit Pandya
(74) *Attorney, Agent, or Firm* — Neal, Gerber & Eisenberg LLP

(57) ABSTRACT

A video output signal analyzes that analyzes a video output signal to determine game play information. In video poker, card values and player strategies can be determined based on a "reverse encoding" of the video signal to determine the original video bitmap. The bitmap can then be analyzed to determine what is taking place during a game, without having to receive this information directly from the processing unit that is actually implementing the game.

8 Claims, 6 Drawing Sheets

(56) References Cited

U.S. PATENT DOCUMENTS

| | | | |
|---|---|---|---|
| 8,425,318 B2 | 4/2013 | Canterbury et al. | |
| 8,677,420 B2 | 3/2014 | Cromarty et al. | |
| 8,784,196 B2 | 7/2014 | Little et al. | |
| 2002/0123376 A1* | 9/2002 | Walker et al. | 463/11 |
| 2002/0151360 A1 | 10/2002 | Durham et al. | |
| 2003/0157980 A1 | 8/2003 | Loose et al. | |
| 2004/0135316 A1* | 7/2004 | Lipscomb | 273/274 |
| 2004/0266515 A1 | 12/2004 | Gauselmann | |
| 2005/0140088 A1 | 6/2005 | Randall | |
| 2005/0164762 A1 | 7/2005 | Smith et al. | |
| 2005/0239546 A1 | 10/2005 | Hedrick et al. | |
| 2005/0255912 A1 | 11/2005 | Love et al. | |
| 2006/0009286 A1 | 1/2006 | Durham et al. | |
| 2006/0121972 A1 | 6/2006 | Walker et al. | |
| 2006/0135248 A1 | 6/2006 | Anderson et al. | |
| 2006/0166731 A1* | 7/2006 | Yoshimi et al. | 463/20 |
| 2007/0004513 A1 | 1/2007 | Wells et al. | |
| 2007/0010318 A1 | 1/2007 | Rigsby et al. | |
| 2007/0026922 A1* | 2/2007 | Lindo et al. | 463/16 |
| 2008/0004104 A1 | 1/2008 | Durham et al. | |
| 2008/0113755 A1 | 5/2008 | Rasmussen et al. | |
| 2008/0136741 A1 | 6/2008 | Williams et al. | |
| 2008/0220849 A1 | 9/2008 | Wadleigh et al. | |
| 2009/0075721 A1* | 3/2009 | Pacey et al. | 463/20 |
| 2009/0149253 A1* | 6/2009 | Kelly et al. | 463/36 |
| 2009/0233705 A1 | 9/2009 | LeMay et al. | |

* cited by examiner

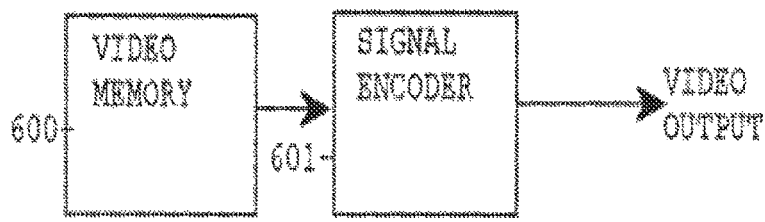
FIGURE 6A
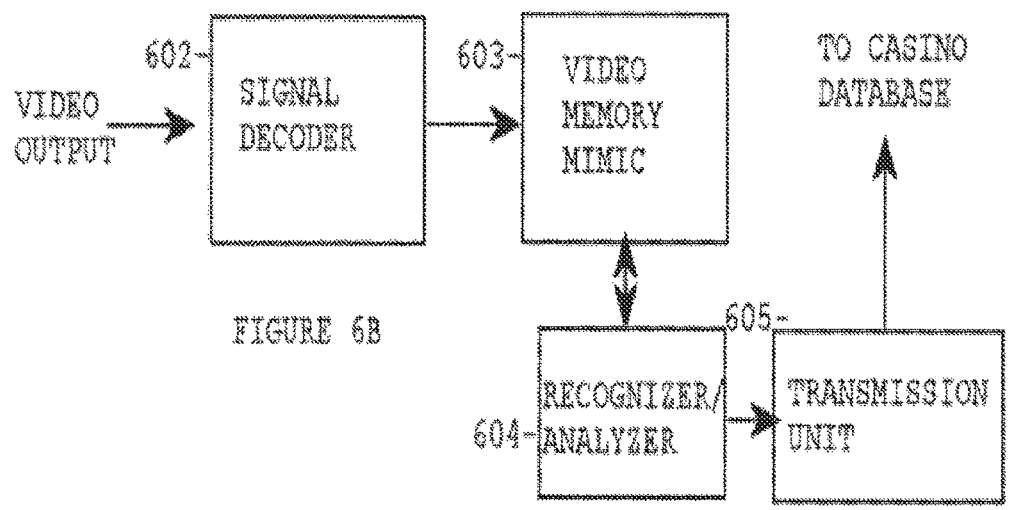
FIGURE 6B
FIG. 6

SYSTEM TO DECODE VIDEO SIGNAL FROM ELECTRONIC GAMING DEVICE AND TO DETERMINE PLAY INFORMATION

CROSS-RELATED APPLICATION DATA

This application is a continuation of U.S. patent application Ser. No. 11/847,062, filed Aug. 29, 2007, which is a continuation-in-part of U.S. patent application Ser. No. 11/468,946, filed on Aug. 31, 2006, which is a continuation-in-part of U.S. patent application Ser. No. 10/689,407, filed on Oct. 20, 2003, now U.S. Pat. No. 7,335,106.

BACKGROUND OF THE INVENTION

1. Field of the Invention

The present invention relates to a system to decode video signal output on an Electronic Gaming Device (EGD) and determine player actions which can then be transmitted to a casino database for promotional and other use.

2. Description of the Related Art

Video poker is a popular form of wagering in a casino. In a standard game of video poker, a player is dealt five cards, the player can indicate which cards the player wishes to discard, upon which the player can press a draw button and the discarded cards can then be replaced. Video poker machines can transmit to a casino host a result of each game which includes how much the player has won or lost on each game.

The current infrastructure may not provide an easy way for an EGD to transmit a video poker player's decisions. For example, a player may choose to select to hold certain cards but the EGD may be designed to only transmit to a casino database certain limited information. However, other systems may be configured to provide further information regarding the player actions, cards dealt, cards held etc.

For years the casino industry has been faced with a dichotomy; slot players are rated on a real time actual basis while table games players are rated on an estimated basis. Part of the problem for casinos is that in blackjack in particular, player decisions may significantly affect the expected win for a casino. Likewise with video poker, player decisions have a significant impact on casino win. However, present systems may not be capable of accounting for the impact of player decisions in video poker. The result is that casinos only realize very late in their relationship with a customer that their play varies substantially from what it should be. Present systems typically utilize an average theoretical win per hand for video poker players as opposed to trying to accurately gauge the true value of a video poker player.

It would be desirable if the EGD could transmit to the casino database information about what decisions the player has made. Certain players may be more desirable to the casino than other players based on their decisions. By not transmitting such information, the casino is missing out on relevant information. For systems that do transmit detailed play information, it is desirable for a system that collects, analyzes and processes the received information.

SUMMARY OF THE INVENTION

In general, the present invention includes a system and method to decode a video signal output from an EGD and displayed on an output device. The video signal can then be analyzed to determine information about what has taken place during a game. The information can then be transmitted to a casino database in order that the casino database can tabulate and store the relevant information so it can be used at a later time.

In one embodiment of the present invention, the decoded video includes standard video signals that are transmitted to or sent to the gaming device or the video display. In another embodiment of the present invention, the video content can be slightly modified to embed information, such as through the creation of a covert channel. In yet another embodiment of the invention, the items displayed can be watermarked and the content displayed can be verified by reading the embedded watermarks.

DESCRIPTION OF THE DRAWINGS

Various aspects, features and advantages of the present invention will become fully appreciated as the same becomes better understood when considered in conjunction with the accompanying drawings, in which like reference characters designate the same or similar parts throughout the several views, and wherein:

FIG. 6A is a system diagram illustrating how a video signal is generated.

FIG. 6B is a system diagram illustrating a possible structure of the video signal analyzer.

DETAILED DESCRIPTION OF THE INVENTION

The present invention is directed to a video signal analyzer which can receive a video signal of an electronic gaming device (EGD) that is transmitted to an output device (such as a CRT or touch screen display). The analyzer does not interfere with the output signal and the EGD plays normally. The analyzer analyzes the video signal to decipher what is going on during play of the EGD and can extract useful information from the output signal. The useful information can then be transmitted to a casino database so that the casino can store this information for later use for marketing, promotional, or other purposes.

Figure 1:
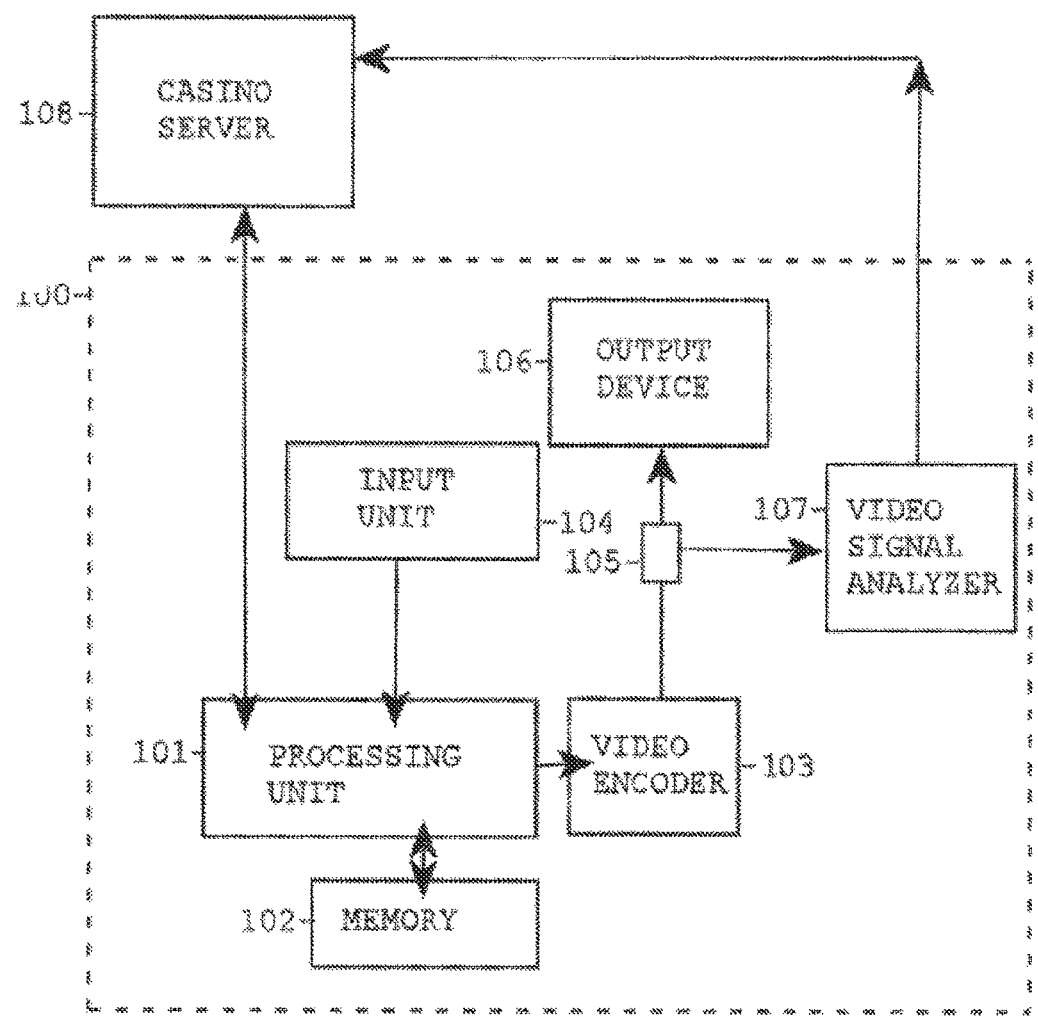
FIG. 1 is a system diagram illustrating an EGD with a video signal analyzer.

FIG. 1 is a system diagram illustrating an EGD with a video signal analyzer. An EGD 100 can comprise a processing unit 101 which contains a processor, cache, and other components to drive a wagering game such as video poker (or other games such as slot machines). A memory 102 is connected to the processing unit 101 which is used to store data needed for play of the game. The processing unit 101 is connected to a video encoder 103 which takes a digital image in video memory and converts it to a video signal which can be output to an output device (e.g., NTSC, PAL, VGA, SVGA, DVI, S-Video, component, composite, or other standard or proprietary format).

The video encoder 103 transmits the video signal to a splitter 105 which splits the video signal into a first signal and a second signal. A first signal is output to an output device 106, such as an LCD display, touch screen display, etc. The second signal is transmitted to a video signal analyzer 107. The splitter 105 and the video signal analyzer 107 can exist inside the physical EGD or can exist externally to the EGD as an independent, or separate unit. FIG. 1 shows them all internal to the EGD for simplicity.

The video signal analyzer 107 serves to analyze the second signal, which is identical to the original video signal, (but not interfering with output of the original video signal sent the output device 106). The analysis comprises constructing a block of memory to mimic what the video memory used by the video encoder to generate the video signal looks like. Then, this block of memory is analyzed in order to determine actions taking place in the game and also by the player. For example, character recognition can be used to identify each card dealt to the player. Replacement cards can also be detected, and other cues from the block of memory can be used (such as a "GAME OVER") indicator to note when the game has been completed. From these images, the video signal analyzer can determine which cards the player was dealt, which cards the player decided to hold or discard, and what the replacement cards were. Such "game play information" can then be transmitted to a casino server 108 which can store the information in a database in a record tagged to the current player. The current player can be identified by a loyalty card used by the current player inserted into a loyalty card reader (not pictured). The processing unit 101 can also be in communication with the casino server 108 so that the processing unit 101 can transmit other information, such as the bet amount, win or loss result, etc.

Thus, while the processing unit 101 transmits information to the casino server 108 so that the casino server 108 knows how many credits the current player has, the video signal analyzer 107 can also transmit information to the casino server 108 (or another casino database) so that more detailed game play data can be extracted and stored by the casino.

Figure 2:
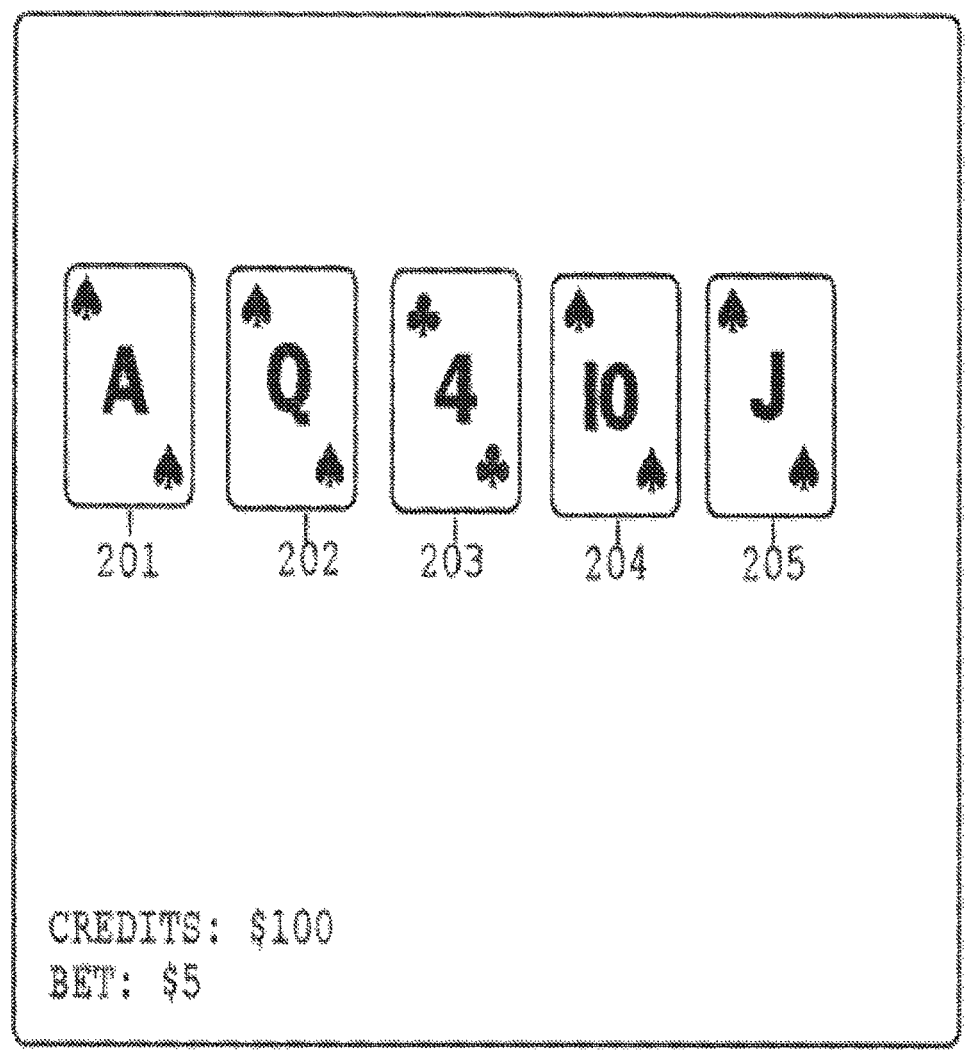
FIG. 2 is an output of a first stage of a video poker game.

FIG. 2 is an output of a first stage of a video poker game. A player places a wager by inserting cash, indicating to the machine how much the player wishes to bet, and presses a "deal" button. Five cards are dealt to a player. The player can indicate which cards to hold (for example by touching the cards on a touch screen display), and then press a "draw" button (either on the touch screen display or a physical draw button), whereby all of the cards that are not selected to be held are replaced.

A sample payout table is illustrated in Table I below.

TABLE I

| HAND | PAYS |
| --- | --- |
| Royal flush | 800 |
| Straight flush | 50 |
| Four of a kind | 25 |
| Full house | 9 |
| Flush | 6 |
| Straight | 4 |
| Three of a kind | 3 |
| Two pair | 2 |
| Pair | 1 |

Table I shows various winning hands and their payouts per coin bet. For each five card hand dealt to a player, there is a proper way for the player to select which cards to hold and discard in order to maximize the player's winnings.

In the example in FIG. 2, the player is dealt an ace of spades 201, a queen of spades 202, a four of clubs 203, a ten of spades 204, and a jack of spades 205. Note that the player is one card away from achieving a royal flush. Thus, the player would be playing optimally by holding all of the cards but for the four of clubs 203 in the hope of drawing a king of spades to make a royal flush. If the player decides to take any other action then the player would not be playing optimally. For example, if the player holds the ace of spades, the queen of spades, and the jack of spades, then this would have an expected return of much less than if the player played properly.

In the long run, a casino can determine a player's actual expected win (the amount this player would be expected to win based on their skill level) by computing total win/total bet. In other words, if the player won (was paid out) $90 and bet $100 (to earn the $90 payout), then the player's theoretical win is 90%. However, since video poker has a high variance, a very large number of hands would have to be played by the player in order for the casino to determine the player's true theoretical. This is because the player can play poorly but still be lucky and win money. A better way to determine a player's theoretical win is to determine the skill level of each player without regard to how much the player has actually won or lost. This is because the cards the player will draw are actually beyond the player's control, but the strategy the player chooses is nevertheless under the player's control.

The player's goal is to win the most money by achieving a high ranking hand. Video poker has a definite player strategy wherein a player should maximize the win of his hand by playing the proper strategy. Optimal strategy is a video poker strategy wherein the player plays perfectly in all situations.

Figure 3:
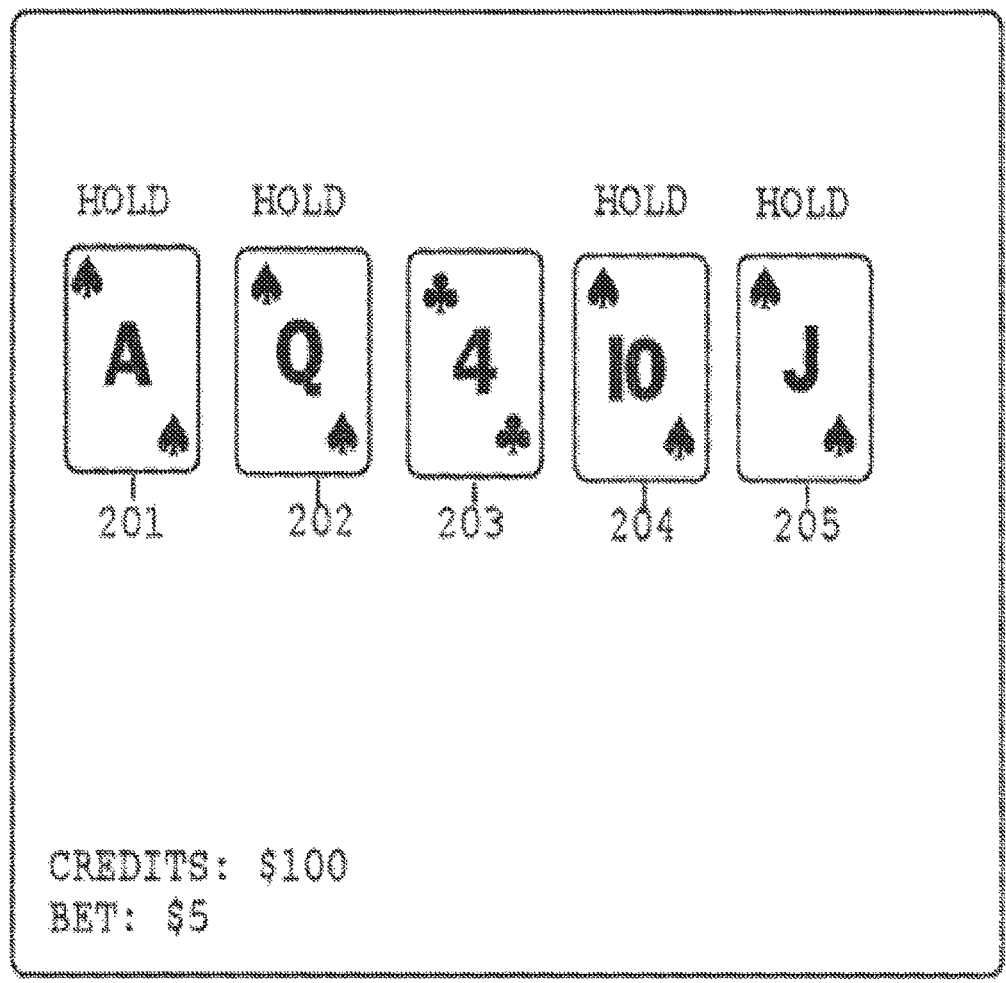
FIG. 3 is an output of a second stage of a video poker game.

FIG. 3 is an output of a second stage of a video poker game. In the second stage, the player has decided to hold the ace of spades 201, the queen of spades 202, the ten of spades 204, and the jack of spades 205. The output device displays an indicator for each card held (for example, "HOLD") so that the player knows which card he is holding.

When the player is satisfied with his selection of cards to hold and discard (cards not held are to be discarded), the player can press a "draw" button, which will replace the discarded cards with new cards randomly "dealt" from the deck.

In this example, the player has played properly by holding the four cards to a royal flush.

Figure 4:
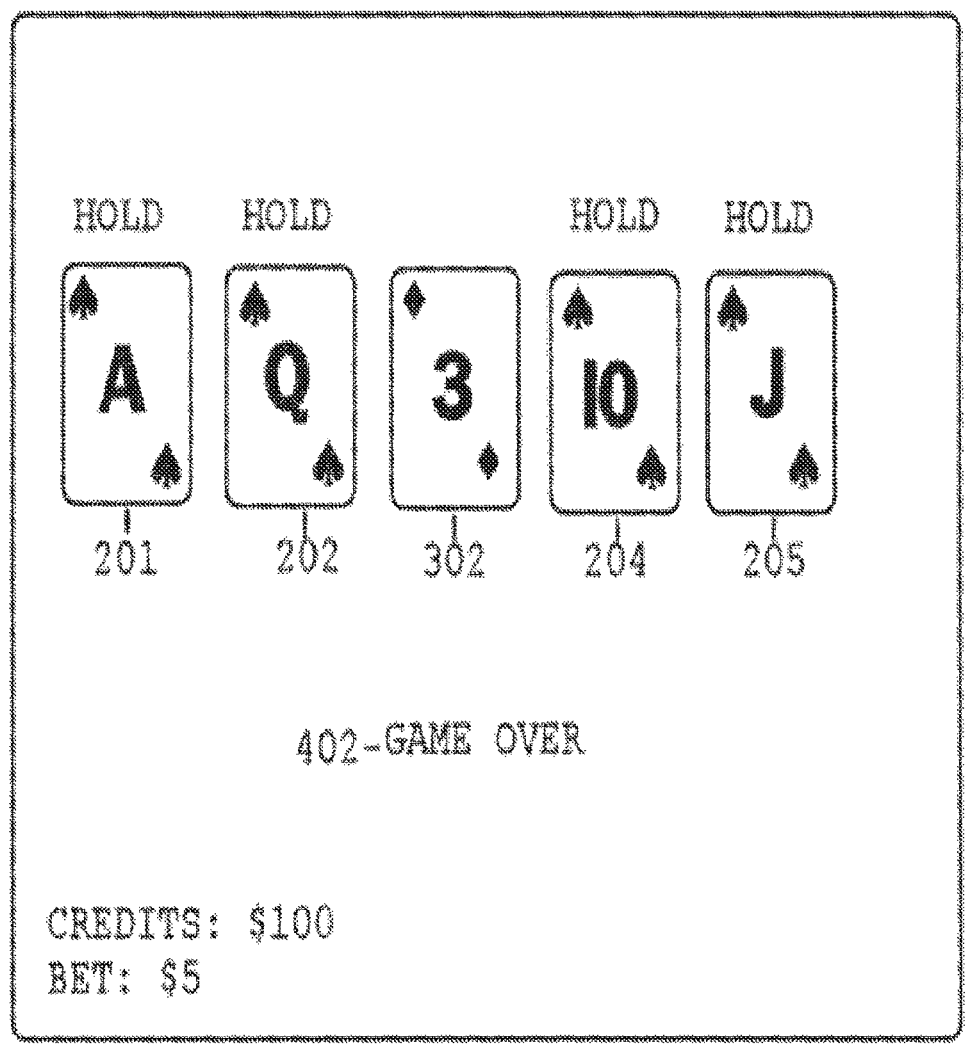
FIG. 4 is an output of a third stage of a video poker game.

FIG. 4 is an output of a third stage of a video poker game.

The EGD replaces the four of clubs 203 with a new card, a three of diamonds 302. This is a losing hand (according to Table I) and the player loses his original wager. Even though the player played properly, the player of course cannot win each time, and in fact the probability of the player drawing into the royal flush was small (but the potential award large). A "GAME OVER" indicator 402 indicates that the game is over. The player can now decide to begin a brand new game by placing a new wager, or cash out by pressing a "cash out" button on the EGD.

By analyzing the video signals, the present invention can identify the following information from the display illustrated in FIGS. 2-4: The player was initially dealt an ace of spades 201, a queen of spades 202, a four of clubs 203, a ten of spades 204, and a jack of spades 205; that the player held the ace of spades 201, the queen of spades 202, the ten of spades 204, and the jack of spades 205, and that the replacement card was a three of diamonds 302. This information can be considered "game play information." Game play information is information regarding occurrences during the game and player actions (if any) which are used to determine a result.

The game play information can be analyzed locally by the video signal analyzer 107 (or another component), to determine the player error (if any), and then the error can be transmitted to the casino database. If the player does not play the hand properly, this can be considered an error. The casino database can store player information such as a total number of hands played by the player and an average error. This information can be used by the casino hosts when deciding to which players to offer incentives. A player of a lesser playing level might be more attractive to a casino than a player who plays perfect strategy.

The video signal analyzer 107 scans the video signal in real time in order to determine the game play information. It should also be appreciated that the present invention may operate in an environment in which the EGD does provide an output identifying all of the playing parameters or a more robust subset of the playing parameters. Thus, in some embodiments, the present invention may be required to rely totally on an analysis of the video content, while other embodiments may use a mixture of video content analysis coupled with information provided over the bus of the EGD (such as the SAS port) and in other embodiments, the invention may only utilize the data provided from the EGD machine data port.

Figure 5:
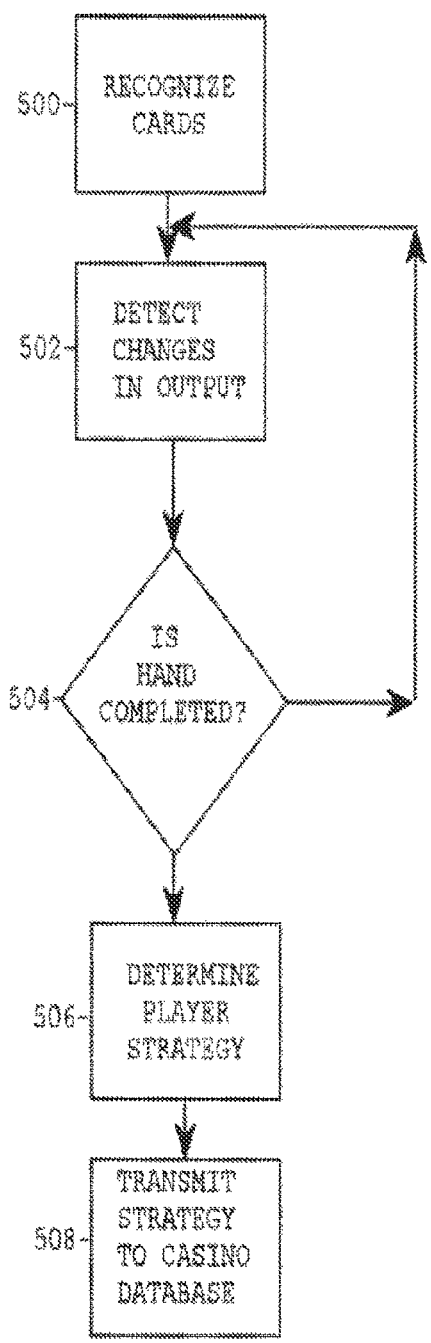
FIG. 5 is a flowchart of a process to decode and transmit video signals.

FIG. 5 is a flowchart of a process to decode and transmit video signals at the start of a new game.

Process 500 recognizes the cards dealt initially. This can be done by pre-storing the image files used for generating each of the cards and also storing where on the screen the cards are to be displayed. The video signal analyzer 107 can compare each image on the pre-stored locations and when an image file matches what is received from the video signal then it is known that this is a particular card. All five cards dealt can be determined in this manner Process 502 detects changes in the output. If the screen has changed, then some action must have occurred.

Process 504 determines whether the hand is completed. This can be performed by checking in a particular location on the output device (actually in a block of memory which is mimicking the video memory) for a game termination indicator, such as a "GAME OVER" indicator. If the hand is not yet completed (the game is not yet over), then flow can return to process 502 which continues monitoring and detecting changes in the video signal.

When process 504 determines that the hand is completed, then the overall process continues to process 506 which determine the player's indications of cards to hold. This can be done by detecting new cards that were not present when the initial cards were recognized in process 500. This can also be accomplished by identifying "hold" or "selected" indicators that identify the held cards. When a new card is detected (using the method described in process 500), then this can be assumed that it replaced a card "behind" it (and thus the player did not select this card to be held).

Thus, knowing the initially dealt cards and the replacement cards, it can be determined which cards the player selected to hold. Thus, knowing all of this information, in conjunction with the known paytable, the player's strategy (and the player's error, if any) can be computed.

Process 508 computes the error and transmits the error to the casino database 508. The optimal strategy for the hand dealt to the player can be determined and the way the player has played out the hand can be compared to the optimal strategy to determine if the player played properly or not. The error can be computed by subtracting the theoretical win from the way the player actually played from the optimal return (the return if the player played the hand perfectly). Thus, for example, if optimal strategy results in an average return of 101% and the way the player played results in an average return of 98%, then the player has made an error which cost him 3%.

Referring now to FIGS. 2-4, the process illustrated in FIG. 5 will now be applied. In FIG. 2, process 500 would recognize all five cards. The five cards would be stored in a RAM.

Process 502 would continue receiving and analyzing the video signal to detect changes in output so those changes can be analyzed. When in FIG. 3, the player is indicated his selections to hold, process 502 would detect these changes and then process 504 would determine whether the hand is over. This can be determined by detecting a game termination condition such as the "GAME OVER" message or any other visual cue that the game is over. The hardware implementing the process illustrated in FIG. 5 would be programmed with knowledge of the video poker game in question so it would know the locations of elements such as cards and other visual cues or indicators so that the progress of the game can be followed. The process can continue to process 502 and continue detecting changes until process 504 determines that the game has ended.

When the player has completed his selection of cards to hold (in this case first, second, fourth, and fifth card), and the player presses draw, then the display illustrated in FIG. 4 results. Process 504 can determine that the "GAME OVER" indicator has appeared, thus indicating that the current game is over.

Once the game has ended, then process 506 can determine the player strategy. The final cards should still remain on the screen and the cards ranks can be discerned as the initial cards were. It would be recorded that only one card changed, the third card, from a four of clubs to a three of diamonds. Thus it can be concluded that the player held the first, second, fourth, and fifth card, playing properly.

The process can begin anew for each new game played by the player. After process 506, detection can still be active for when the player starts a new game. This can be accomplished, for example, when new cards are dealt, the "GAME OVER" indicator has been removed, or some change has been detected on the actual output. Once a new game been detected, the process in FIG. 5 can begin over again.

Thus, by analyzing the video signal, at least the following game play information can be determined: that the player's initial cards were: ace spades, queen spades, four clubs, ten spades, jack of spades; that the player held the ace spades, queen spades, ten spades, and jack spades; and that the four of clubs was replaced with a three of diamonds. Note that the latter piece of information may not even be necessary, as the player's error is not affected by the player's actual result. Whether the player hit the royal flush or not would not be indicative at all of whether the player had played properly or not in this instance.

A player who plays perfectly or close to perfectly (little or no error) is considered to have high skill, while the player who plays with a larger margin of error (from perfect strategy) is considered to have poor skill.

FIG. 6A is a system diagram illustrating how a video signal is generated. A video memory 601 is read by a signal encoder 601 which transforms the image in the video memory 600 into a video signal readable by an output device. The encoder is programmed specifically for a particular type of video signal.

FIG. 6B is a system diagram illustrating a possible structure of the video signal analyzer. This can be considered the reverse of what takes place in FIG. 6A. A video output (such as the video output from FIG. 6A) is fed into a signal decoder 602. The signal decoder 602 can be considered the opposite of the signal encoder 601. The signal decoder 602 receives the video output signal and converts it into an image map or video memory mimic 603 (a block of RAM) which is memory that stores values that can be identical or correlated to what the video memory was that was used to create the video output signal in the first place. For example, if the video output signal is a digital signal, then each pixel of the digital signal can be mapped to a pixel in the video memory mimic 603 (for example using a pixel map).

Once the video memory mimic 603 is generated, then this can be analyzed using image recognition techniques. A recognizer/analyzer 604 recognizes images in the video memory mimic 603 can perform an analysis on what is recognized (for example, perform the process illustrated in FIG. 5).

A plurality of image maps can be stored so that the recognizer/analyzer 604 can retrieved the images maps and compare them to relevant portions of the video memory mimic 603. When a match is found, then the recognizer/analyzer 604 knows that a particular element is being displayed. As soon as the initial cards are dealt, the recognizer/analyzer 604 should recognize the card images and determine the card ranks (which are mapped to each card image) immediately. Then the recognizer/analyzer 604 can wait until the game is completed and then determine which (if any) cards were replaced, so the player's decision (strategy) can be determined It is noted that the examples and methods described in this document are just one example of how the invention can be implemented, but one of ordinary skill in the art could appreciate that video poker can be implemented in different fashions and that processes herein should be tailored to the particular version of video poker (or other game) being played.

Once data has been produced (for example, a skill rating of the player for a particular hand of video poker), the data can be transmitted to a transmission unit 605 which then transmits the data to a casino database. The data may be transmitted with some type of identifier identifying the current player.

In an embodiment of the present invention, player decisions on video poker machines in real time are used to determine true video poker house advantage and using the same to compute theoretical win for the purposes of complimentary qualification.

The invention thus utilizes actual player hold/discard decisions for individual poker hands to ascertain a more accurate theoretical win percentage for individual players. This method involves comparing actual player decisions to best or optimal strategy to derive a more accurate theoretical win expectation which can then be used to derive theoretical win and other related statistics. Players that play at a higher theoretical win expectation (a better player) may not be desirable players to the casino, while players that play at a lower theoretical win expectation (worse players) may be more desirable. The worse video poker players may receive marketing promotions (such as free or discounted room) in order that they visit the casino where they will hopefully lose money playing video poker.

One advantage of the present invention is that direct communication with a processing unit (such as processing unit 101) which is controlling the game is not needed (and such communication may not even be possible). Thus, if the casino wishes to know what a player's playing strategy is, then a video signal analyzer and related apparatuses can be implemented to produce game play information relating to the player's game (including the player's errors) can be implemented.

It is further noted that the methods described herein are not merely limited to video poker. The present invention can be applied to any other type of wagering game. For example, video blackjack can be processed similarly, so that a player's skill at video blackjack can be determined. Even slot machine games can be analyzed so that each individual symbol can be determined and stored. While such slot machine games may not require any skill, it may still be helpful to the casino to track which symbols have appeared during the player's play.

Another aspect of the present invention is the analysis of the video content to verify authenticity of the gaming software. For instance, in a video poker game, a watermark can be embedded in the playing cards. By reading the video content and examining the watermark, the authenticity of the software driving the display can be verified. Also, the watermark can be structured in such a manner that it greatly simplifies the ability to detect the video content. For instance, rather than having to analyze the entire video stream to ascertain the content of the video, the special embedded signals can be search for and detected.

It will be appreciated that the above described methods and embodiments may be varied in many ways, including, changing the order of steps, and the exact implementation used. The present invention has been described using detailed descriptions of embodiments thereof that are provided by way of example and are not intended to limit the scope of the invention. The described embodiments comprise different features and aspects, not all of which are required in all embodiments of the invention. Some embodiments of the present invention utilize only some of the features or aspects or possible combinations of thereof. Variations of embodiments of the present invention that are described and embodiments of the present invention comprising different combinations of features noted in the described embodiments will occur to persons of the art.

What is claimed is:

1. A video analyzing apparatus comprising:
   a video signal analyzer configured to:
   (a) receive a video signal from an electronic gaming device, said received video signal being split from a video output signal transmitted from a video encoder of the electronic gaming device to a display device of the electronic gaming device, wherein:
      (i) said received video signal is associated with at least one image displayed on the display device of the electronic gaming device,
      (ii) said split of the video signal from the video output signal does not interfere with any display of any images on the display device of the electronic gaming device, and
      (iii) said electronic gaming device is associated with a credit balance which is:
         (A) increasable via:
            (I) an acceptor of a physical item associated with a monetary value, and
            (II) a validator configured to identify the physical item, and
         (B) decreasable via a cashout device configured to receive an input to cause an initiation of a payout associated with the credit balance, and
   (b) determine, based at least in part of the at least one image associated with the received video signal, game play information associated with a play of a game of the electronic gaming device; and
   a transmission unit configured to transmit the game play information to a casino database.

2. The video analyzing apparatus of claim 1, wherein the game play information includes information associated with at least one player decision for the play of the game.

3. The video analyzing apparatus of claim 2, wherein the at least one player decision for the play of the game is associated with a player skill.

4. The video analyzing apparatus of claim 1, wherein the at least one image includes a watermark.

5. A gaming system comprising:
   an electronic gaming device including:

a housing,
a plurality of input devices supported by the housing, said plurality of input devices including:
  (i) an acceptor,
  (ii) a validator, and
  (ii) a cashout device,
a display device,
a processor, and
a memory device which stores a plurality of instructions, which when executed by the processor, cause the processor to operate with the plurality of input devices and the display device to:
  (a) if a physical item is received via the acceptor:
    (i) identify, via the validator, the received physical item, and
    (ii) establish a credit balance based, at least in part, on a monetary value associated with the received and identified physical item,
  (b) receive a wager on a play of a game, said credit balance being decreasable based on said wager,
  (c) display, based on a first video signal transmitted, via a splitter, from a video encoder, at least one game play image associated with the wagered on play of the game, and
  (d) if a cashout input is received via the cashout device, cause an initiation of any payout associated with the credit balance, and
a video signal analyzer configured to:
  (i) without interfering with the display of the at least one game play image by the electronic gaming device, receive a second video signal transmitted, via the splitter, from the video encoder, said received second video signal being associated with the at least one game play image,
  (ii) determine, based at least in part of the at least one image associated with the received second video signal, game play information associated with the wagered on play of the game, and
  (iii) transmit the determined game play information to a casino database.

6. The gaming system of claim 5, wherein the game play information includes information associated with at least one player decision for the wagered on play of the game.

7. The gaming system of claim 6, wherein the at least one player decision for the play of the game is associated with a player skill.

8. The gaming system of claim 5, wherein the at least one image includes a watermark.

* * * * *